Aug. 18, 1953 — K. J. HERSEY ET AL — 2,649,307
KNOCKDOWN TYPE TWO-WHEEL TRAILER
Filed July 30, 1951 — 3 Sheets-Sheet 1
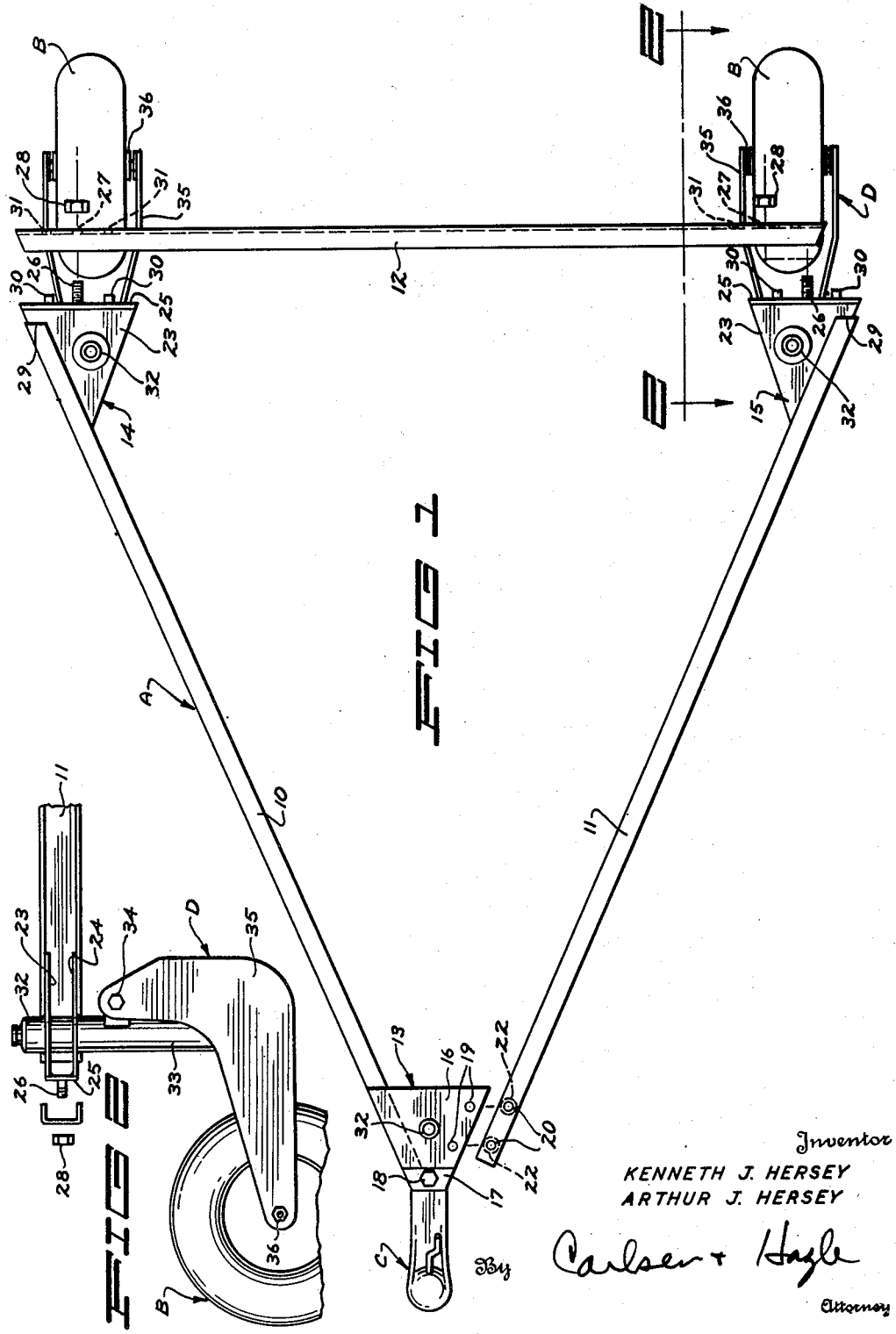
Inventor
KENNETH J. HERSEY
ARTHUR J. HERSEY

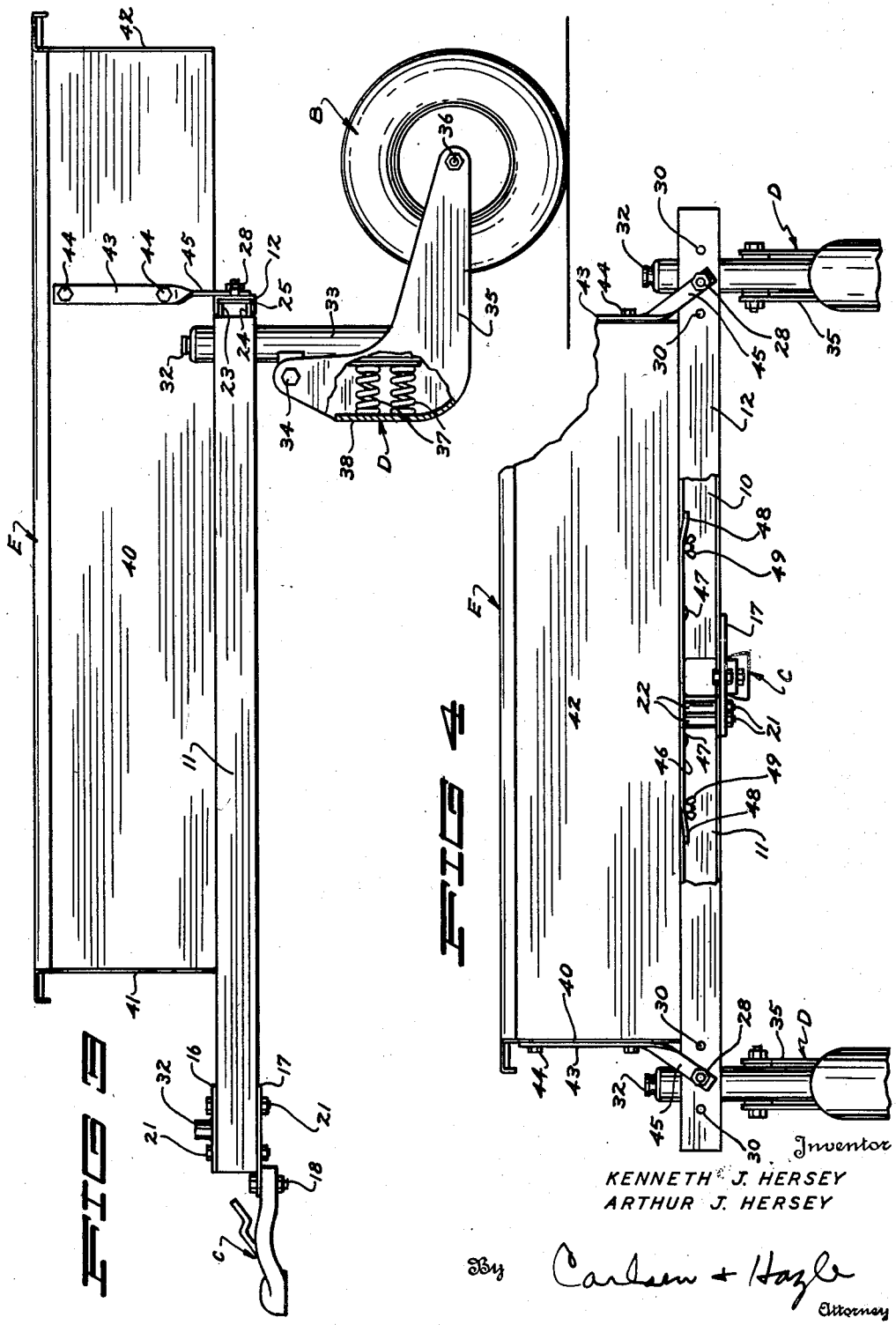

Aug. 18, 1953     K. J. HERSEY ET AL     2,649,307
KNOCKDOWN TYPE TWO-WHEEL TRAILER
Filed July 30, 1951     3 Sheets-Sheet 3
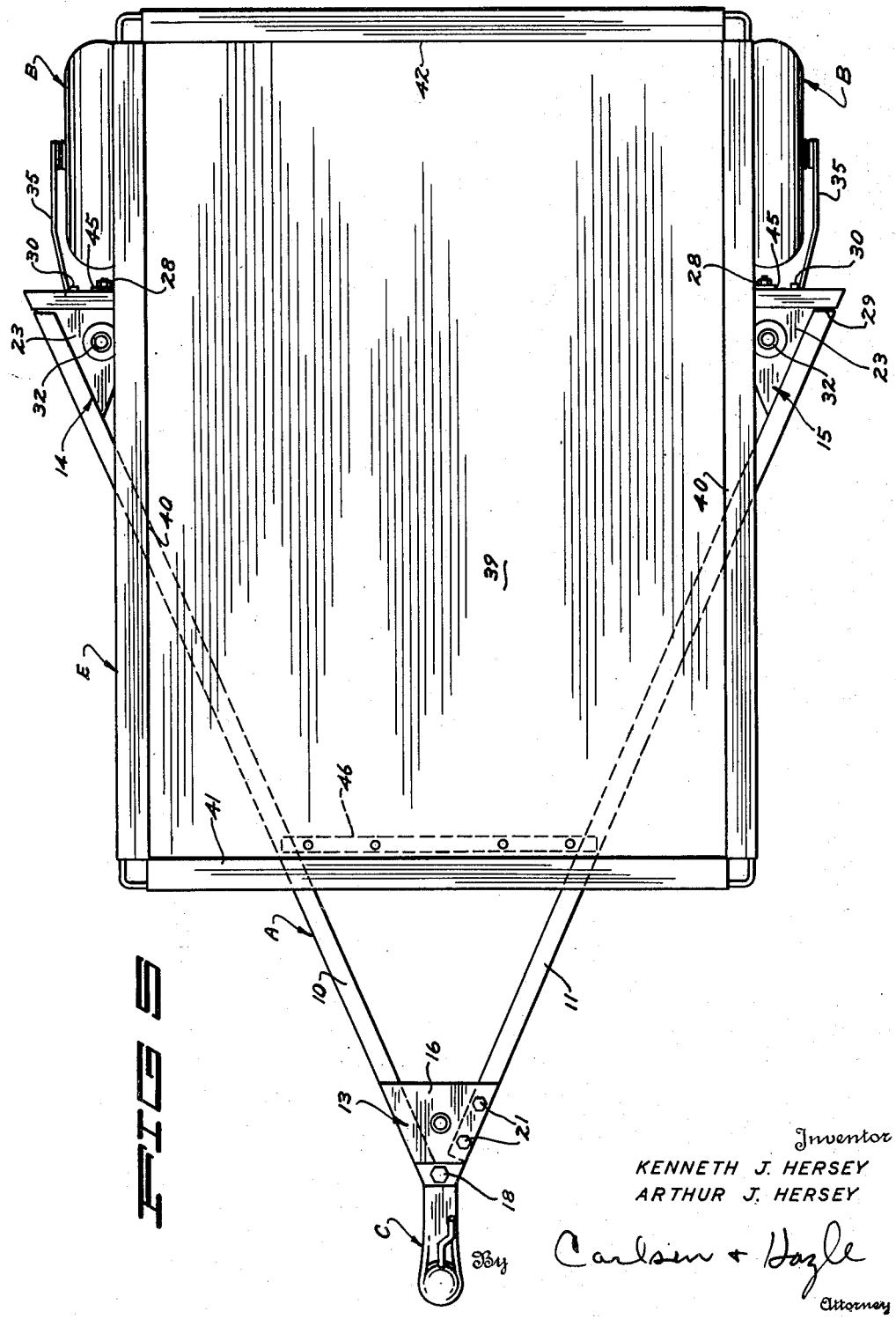
Inventor
KENNETH J. HERSEY
ARTHUR J. HERSEY

UNITED STATES PATENT OFFICE 2,649,307

KNOCKDOWN TYPE TWO-WHEEL TRAILER

Kenneth J. Hersey and Arthur J. Hersey, Minneapolis, Minn.

Application July 30, 1951, Serial No. 239,282

4 Claims. (Cl. 280—33.4)

This invention relates generally to improvements in trailers for use in connection with a towing vehicle and as the family automobile for transporting material of all kinds, boats and the other and many uses to which such vehicles are put.

Trailers of this kind are ordinarily quite small, as compared to the commercial trailers, but nevertheless they represent a problem about the home in that convenient storage space for the trailer is not often available. Most such trailers are also limited in their uses since if they are provided with a box for moving goods they are then not suitable for carrying such objects as duck boats and in many cases it is necessary to have two trailers in order to meet all demands.

It is the primary object of our invention to provide a trailer which solves these problems, and which may be quickly and easily disassembled for storage of the pieces separately or in a compact bundle, or may be folded up in part for the same purpose, but which may be also readily reassembled when required. Another object is to provide a trailer which may be readily adapted to a wide variety of uses at the will of the owner. Still another object is to provide a structure or assembly for a trailer of this character which facilitates its fabrication in any size required.

These and other more detailed and specific objects will be disclosed in the course of the following specification, reference being had to the accompanying drawings, in which—

Fig. 1 is a plan view of the basic trailer frame showing it in process of disassembly for storage.

Fig. 2 is a detail sectional view along the line 2—2 in Fig. 1.

Fig. 3 is a side view of the assembled trailer, equipped with a box for hauling materials and goods.

Fig. 4 is a fragmentary and partially sectional rear elevation of the assembly of Fig. 3.

Fig. 5 is a plan view of the trailer of Fig. 3.

Referring now more particularly and by reference characters to the drawing, our improved trailer comprises a main or basic frame unit designated generally at A, having spaced rear support wheels B and a forwardly arranged hitch C of conventional type by which the trailer is attached to the towing vehicle (not shown).

The frame A tapers in a forward direction and includes forwardly converging side bars 10 and 11 and a rear cross bar 12. These elements 10, 11 and 12 are united at one forward and two rear corners by corner or tie units indicated respectively at 13, 14 and 15. The bars 10, 11 and 12 are formed from conventional structural channels and the forwardly located tie unit 13 includes upper and lower plates 16 and 17 which are welded atop and below the forward end of one side bar, here shown as the bar 10. The plates 16 and 17 are in the shape of truncated triangles corresponding to the angles at which the side bars converge and the lower plate 17 extends forwardly to receive a bolt 18 by which the hitch C is mounted. The edges of the plates 16 and 17 opposite those welded to the side bar 10 are provided with vertically aligned apertures 19 adapted to register with apertures 20 in the upper and lower flanges of the opposite side bar 11 and to receive bolts 21 by which this bar is fastened at its forward end. Tubular bushings 22 welded in the channel pass the bolts 21 and allow them to be drawn up tight without springing the flanges as will be readily understood.

The rear tie units 14 and 15 are identical and each comprises triangular upper and lower plates 23 and 24 which are permanently welded inside the upper and lower flanges of the associated side bars 10 and 11 and are thus permanently anchored to these bars. The shape of the plates 23 and 24 is such that their rear edges meet and square with the transversely extending rear cross bar 12 and these rear edges of the plates are joined by vertical back plates or mounting plates 25 welded in place. Centrally located on each plate 25 is a threaded fastening stud or bolt 26 which is welded in place and extends rearwardly to enter a corresponding aperture 27 in the adjacent end of the rear cross bar 12. It will be noted that the upper and lower flanges of the bar 12 slip nicely forward over the rear edges of the corner plates 23 and 24 and a nut 28 is placed on each stud 26 so that when drawn up tight the rear bar will be firmly but detachably united with the remainder of the frame. The rear ends of the side bars 10 and 11 terminate short of the rear outer corners of the plates 23 and 24 to clear the flanges of the rear cross bar when it is in place, as designated at 29. Short dowel or pilot pins 30 are also permanently mounted on the rear plates 25 at each side of the studs 26 to enter openings 31 in the rear cross bar and so overcome any twisting tendencies at the frame corners.

At each corner of the frame a tapped socket member 32 is mounted to receive the threaded lower ends of short pipe sections (not shown) which may be used to suspend one or more boats (also not shown).

The rear corners of the trailer frame are supported on the wheels B by suspension units designated generally at D which are substantially identical to the units disclosed in our prior copending application, Serial No. 720,904 for Wheel Suspension, filed January 8th, 1947, now patent No. 2,526,866, dated October 24th, 1950. These units each comprises an upright axle member 33 which extends upwardly through the corner plates 23 and 24 and is permanently welded thereto. The axles depend at each corner and pivoted at 34 to the axles are forked arms 35 which extend downwardly and rearwardly. The wheels B are journaled at 36 between the rear ends of the arms 35 and may move upwardly and downwardly about the pivots 34. Expansion coil springs 37 are braced between the forward sides of the axles 33 and the closed forward sides 38 of the arms 35 to yieldably resist upward movements of the wheels and so absorb road shocks as pointed out in our earlier application.

For transporting materials and goods we provide a rectangular box E having a bottom 39, upstanding sides 40 and front and rear ends 41 and 42. This box may be made of any suitable material and is of a size such that it is narrower than the extreme width of the trailer frame A. Brackets or mounting straps 43 are secured at 44 to the sides 40 of the box and at lower ends are twisted and turned outwardly to fit against the rear of the cross bar 12. These ends indicated at 45 depend below the box and are apertured to fit over the aforesaid studs 26. Thus when the nuts 28 are drawn up the box will be pushed forward and held down at its rear corners. To anchor the front end of the box we provide a cross bar or strap 46 which is secured at its center at 47 to the bottom 39 of the box and at its ends is bent downwardly as at 48 to slip beneath the upper flanges of the forwardly converging side bars 10 and 11. Bolts equipped with wing nuts 49 are provided adjacent these ends of the strap 46 and when tightened they clamp the side bar flanges tightly between the strap ends and the bottom of the box.

When it is desired to store the trailer away the box E is first removed (this being also done when boats or the like are to be carried) by loosening the wing nuts 49 and removing the nuts 28. The box may then be pulled rearwardly disengaging the brackets 43 from the studs 26 and slipping the ends 48 of the strap 46 rearwardly until it clears the side bars 10 and 11. The box may then be lifted off and set aside. If the trailer is to be used without the box the nuts 28 are now replaced but if the trailer is to be stored the rear cross bar 12 is removed thus disconnecting the rear corners of the frame. The bolts 21 are now removed and the two sides of the frame are separated and may be carried away, or rolled on the wheels B and stored in very small space as will be understood. Alternatively only one of the bolts 21 may be removed and the sides then swung or folded together about the pivot provided by the remaining bolt. This, however, leaves the sides connected and requires somewhat more storage space. When entirely disassembled the trailer may even be stored away in the basement very conveniently. Reassembly of the trailer parts will be readily understood. To mount the box E it is pushed forward so that the ends of the strap 46 engage the side bars 10—11 and the wing nuts 49 are tightened and the rear end of the box is then anchored by the nuts 28.

The flat frame lends itself to convenient decking over when a small "house" or camping trailer is desired.

The construction which we here provide has the added advantage that it permits the manufacturer to supply trailers of any reasonable size variation merely by proportionally changing the lengths of the frame bars 10, 11 and 12, while the tie units 13, 14 and 15 remain the same. Also the frame may be placed at any height by varying the length of the axle members 33, thus lending itself particularly well to the manufacture of boat trailers to carry one or more boats in an underslung suspension, as will be understood.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. In a trailer of the character described, a triangular frame structure comprising a rear cross channel and a pair of forwardly converging side channels, a front tie unit comprising upper and lower triangular plates permanently fastened to one side channel, bolts detachably fastening the other side channel between the plates, a trailer hitch secured to the front tie unit, a pair of rear tie units each having upper and lower triangular plates permanently attached to the rear ends of the side channels, mounting plates connecting the upper and lower plates of said rear tie units, the rear channel being adapted to fit over the rear tie units up against said mounting plates, means detachably fastening the rear chanel to the mounting plates, and wheel suspension units connected to the rear tie units.

2. In a trailer of the character described, a triangular frame structure comprising a rear cross channel and a pair of forwardly converging side channels, a front tie unit comprising upper and lower triangular plates, permanently fastened to one side channel, bolts detachably fastening the other side channel between the plates, a trailer hitch secured to the front tie unit, a pair of rear tie units each having upper and lower triangular plates permanently attached to the rear ends of the side channels, mounting plates connecting the upper and lower plates of said rear tie units, the rear channel being adapted to fit over the rear tie units up against said mounting plates, means detachably fastening the rear channel to the mounting plates, and wheel suspension units connected to the rear tie units, said wheel suspension units including upright axle members secured to and through the upper and lower plates of the rear tie units.

3. A trailer frame of the character described adapted to be taken apart for storage, comprising in combination, rearwardly diverging side members and a front tie unit detachably connecting the forward ends of said members, a trailer hitch on said front tie unit, a rear cross member extending across the divergent rear ends of the side members and forming therewith a triangular frame, a rear tie unit at each rear corner of the frame and permanently secured to the rear ends of the side members, a wheel suspension unit secured to each of the rear tie units for supporting the frame, and means for detachably fastening the cross member to said rear tie units whereby this cross member may be conveniently removed and the side members then disconnected from each other at their forward ends and rolled away on the wheel suspension units when the trailer is disassembled for storage.

4. A trailer frame of the character described adapted to be taken apart for storage, comprising in combination, rearwardly diverging side members and a front tie unit detachably connecting the forward ends of said members, a trailer hitch on said front tie unit, a rear cross member extending across the divergent rear ends of the side members and forming therewith a triangular frame, a rear tie unit at each rear corner of the frame and permanently secured to the rear ends of the side members, a wheel suspension unit secured to each of the rear tie units for supporting the frame, and means for detachably fastening the cross member to said rear tie units whereby this cross member may be conveniently removed and the side members then disconnected from each other at their forward ends and rolled away on the wheel suspension units when the trailer is diassembled for storage, each of said tie units comprising upper and lower triangular plates welded to said side members.

KENNETH J. HERSEY.
ARTHUR J. HERSEY.

References Cited in the file of this patent

UNITED STATES PATENTS

| Number | Name | Date |
|---|---|---|
| 1,210,056 | Fairman | Dec. 26, 1916 |
| 1,265,705 | Litchfield | May 7, 1918 |
| 1,779,887 | Melanson | Oct. 28, 1930 |
| 2,379,265 | Whitmer | June 26, 1945 |
| 2,410,570 | Davis | Nov. 5, 1946 |